US008285740B2

(12) United States Patent
Graham et al.

(10) Patent No.: US 8,285,740 B2
(45) Date of Patent: Oct. 9, 2012

(54) DATABASE QUERIES WITHIN A GAMING MACHINE

(75) Inventors: Jacob Graham, Sparks, NV (US); Gregory A. Schlottmann, Sparks, NV (US); Jacob C. Bruce, Reno, NV (US); Anthony R. Escalera, Sparks, NV (US)

(73) Assignee: IGT, Reno, NV (US)

( * ) Notice: Subject to any disclaimer, the term of this patent is extended or adjusted under 35 U.S.C. 154(b) by 601 days.

(21) Appl. No.: 11/810,888

(22) Filed: Jun. 6, 2007

(65) Prior Publication Data

US 2008/0305854 A1 Dec. 11, 2008

(51) Int. Cl.
*G06F 7/00* (2006.01)

(52) U.S. Cl. ........................................ 707/769

(58) Field of Classification Search .................. 707/769, 707/755, 771, 999.003

See application file for complete search history.

(56) References Cited

U.S. PATENT DOCUMENTS 6,430,562 B1 * 8/2002 Kardos et al. .................. 707/10
7,480,857 B2 1/2009 Benbrahim et al.
7,515,718 B2 4/2009 Nguyen et al.
2003/0105825 A1 * 6/2003 Kring et al. .................. 709/206
2004/0185936 A1 * 9/2004 Block et al. .................. 463/42
2005/0153778 A1 7/2005 Nelson et al.
2005/0187022 A1 * 8/2005 Walker et al. .................. 463/42
2006/0205457 A1 * 9/2006 Blackburn et al. ................ 463/1
2007/0004506 A1 1/2007 Kinsley et al.
2007/0026935 A1 2/2007 Wolf et al.
2007/0026942 A1 2/2007 Kinsley et al.
2007/0060363 A1 3/2007 Nguyen et al.
2008/0085774 A1 * 4/2008 Gagner et al. .................. 463/43
2009/0124392 A1 * 5/2009 Ruppert et al. .................. 463/42
2009/0181765 A1 7/2009 Benbrahim et al.

FOREIGN PATENT DOCUMENTS

WO WO 2006/039463 A1 4/2006

* cited by examiner

*Primary Examiner* — Kimberly Wilson
*Assistant Examiner* — Mohammed R Uddin
(74) *Attorney, Agent, or Firm* — Weaver Austin Villeneuve & Sampson LLP

(57) ABSTRACT

Methods and devices are provided for querying databases maintained by electronic gaming machines ("EGMs"). The databases preferably follow a predetermined naming convention. In some such implementations, a query is written in a predetermined message field. For example, the query string may be written in a predetermined extension of the Gaming Standards Association's G2S Message Protocol. An EGM (or other device) receiving a message containing such a query may extract the query from the predetermined field, parse the query, determine the requested data and return a responsive message that includes the requested data.

20 Claims, 10 Drawing Sheets

DATABASE QUERIES WITHIN A GAMING MACHINE

BACKGROUND OF THE INVENTION

This invention relates to communication between electronic wager gaming machines and other devices in gaming establishments, such as host devices, servers, kiosks, networked table games, etc.

A gaming machine may operate as a "stand alone" unit or linked in a network of some type to a group of gaming machines. As technology in the gaming industry progresses, more and more gaming services are being provided to gaming machines via communication networks that link groups of gaming machines to one or more network devices (e.g., servers) that provide gaming services and/or game themes. As an example, gaming services that may be provided by one or more servers to networked gaming machines include player tracking, accounting, cashless award ticketing, lottery, tournaments, progressive games and bonus games. Recently, the present assignee has developed methods and devices for downloading game themes, peripheral code and other software to gaming machines.

Although the currently-used methods and devices for communicating with, obtaining data from and controlling devices in a gaming network are adequate, it would be desirable to provide methods and devices that improve upon the prior art.

SUMMARY OF THE INVENTION

Some implementations of the invention provide methods and devices for querying databases maintained by electronic gaming machines ("EGMs"). The databases preferably follow a predetermined naming convention. In some such implementations, a query is written in a predetermined message field. For example, the query string may be written in a predetermined extension of the Gaming Standards Association's G2S Message Protocol. An EGM (or other device) receiving a message containing such a query may extract the query from the predetermined field, parse the query, determine the requested data and return a responsive message that includes the requested data.

In some embodiments of the invention, a remote procedure call may be written in a predetermined message field. An EGM (or other device) receiving a message containing a remote procedure call may extract the remote procedure call from the predetermined field and determine whether to perform the indicated procedure. The device may perform the indicated procedure (or not) and return a responsive message that indicates whether the indicated procedure was performed.

Some implementations of the invention provide a wager gaming machine, comprising apparatus for providing wagering games, a network interface, a memory and a logic device. The memory may have a database stored therein comprising wager gaming data and may have fields organized according to a predetermined format. The logic system may be configured to do the following: receive a first message from a device via the network interface; extract a query from a first predetermined portion of the first message; parse the query to determine indicated wager gaming data; obtain the indicated wager gaming data from the database; form a second message comprising the indicated wager gaming data; and send the second message to the device via the network interface.

The predetermined portion may comprise a predetermined extension to a protocol and/or a predetermined field. For example, the first and second messages may be formatted according to the Gaming Standards Association's G2S Message Protocol. If so, the predetermined portion may comprise a predetermined extension to the G2S Message Protocol. The query may comprise a Structured Query Language query.

The wager gaming data may comprise game usage data, wagering data, configuration data and/or peripheral device data. The logic system may be further configured to parse the query to determine an indicated format for the indicated wager gaming data and to form the second message such that the indicated wager gaming data are provided in the indicated format.

The logic system (or another device) may be configured to determine a permission level of the first message and to obtain indicated wager gaming data according to the permission level. The logic system may be further configured to determine new wager gaming data and update the database in the predetermined format according to the new wager gaming data. The logic system may be further configured to decrypt at least a portion of the first message and/or to encrypt at least a portion of the second message. The logic system may comprise a processor and/or a programmable logic device.

Some implementations of the invention provide a method that includes these steps: receiving, via a network interface of a wager gaming machine, a first message from a device; extracting a query from a first predetermined portion of the first message; parsing the query to determine requested wager gaming data of a database maintained by the wager gaming machine; obtaining the requested wager gaming data from the database; forming a second message comprising the requested wager gaming data; and sending the second message to the device via the network interface. The wager gaming data may, for example, comprise game usage data, wagering data, configuration data and/or peripheral device data.

The parsing step may comprise parsing the query to determine an indicated format for the indicated wager gaming data. The forming step may comprise providing the indicated wager gaming data in the indicated format. The first and second messages may, for example, be formatted according to the Gaming Standards Association's G2S Message Protocol. The query may comprise a Structured Query Language query or another such query. The predetermined portion may comprise a predetermined field and/or a predetermined extension to a protocol.

The method may involve various types of security measures. For example, the method may further comprise determining a permission level of the first message and obtaining indicated wager gaming data according to the permission level. The method may also involve sending an authentication challenge to the device, receiving a response to the authentication challenge and determining whether the response is adequate. The method may involve decrypting at least a portion of the first message and/or encrypting at least a portion of the second message.

Alternative implementations of the invention include these steps: forming a first message according to the Gaming Standards Association's G2S Message Protocol, the first message comprising a first query for first wager gaming machine data, the first query located in a predetermined extension of the G2S Message Protocol; sending the first message to a first wager gaming machine; and receiving a first responsive message from the wager gaming machine, the first responsive message including the first wager gaming machine data. The first query may, for example, comprise a Structured Query Language query. The method may further comprise the step of receiving an indication to obtain the first wager gaming machine data, wherein the forming step is responsive to the indication.

The method may also include these steps: forming second through $N^{th}$ messages according to the Gaming Standards Association's G2S Message Protocol, the second through $N^{th}$ messages comprising second through $N^{th}$ queries for second through $N^{th}$ wager gaming machine data, each of the second through $N^{th}$ queries located in the predetermined extension of the G2S Message Protocol; sending the second through $N^{th}$ messages to second through $N^{th}$ wager gaming machines; and receiving second through $N^{th}$ responsive messages from the second through $N^{th}$ wager gaming machines, the second through $N^{th}$ responsive messages including the second through $N^{th}$ wager gaming machine data.

Alternative embodiments of the invention provide a wager gaming machine that includes these elements: apparatus for providing wagering games; a network interface; and a logic system. The logic system may be configured to do the following: receive a first message from a device via the network interface; extract a procedure call from a first predetermined portion of the first message; and execute a procedure according to the procedure call. The first message may, for example, be formatted according to the Gaming Standards Association's G2S Message Protocol and the first predetermined portion may comprise a predetermined extension of the G2S Message Protocol.

The logic system may be further configured to form a second message indicating that the procedure was executed and to send the second message to the device via the network interface. The procedure may involve changing a configuration of the apparatus for providing wagering games. The logic system may comprise, e.g., a processor and/or a programmable logic device.

Other methods of the invention may include the following steps: forming a first message according to the Gaming Standards Association's G2S Message Protocol, the first message comprising a first procedure call for invoking a first procedure on a first wager gaming machine, the first procedure call located in a predetermined extension of the G2S Message Protocol; sending the first message to the first wager gaming machine; and receiving a first responsive message from the wager gaming machine, the first responsive message indicating whether the first procedure was invoked according to the first procedure call.

The method may include the step of receiving a first indication to configure the first wager gaming machine, wherein the forming step is responsive to the first indication. Accordingly, the first procedure may be for configuring the first wager gaming machine. The first responsive message may indicate whether the first wager gaming machine was configured according to the first procedure call.

The method may also include these steps: forming second through $N^{th}$ messages according to the Gaming Standards Association's G2S Message Protocol, the second through $N^{th}$ messages comprising second through $N^{th}$ procedure calls for invoking the first procedure on second through $N^{th}$ wager gaming machines, each of the second through $N^{th}$ procedure calls located in the predetermined extension of the G2S Message Protocol; sending the second through $N^{th}$ messages to the second through $N^{th}$ wager gaming machines; and receiving second through $N^{th}$ responsive messages from the second through $N^{th}$ wager gaming machines. The second through $N^{th}$ responsive messages may indicate whether the first procedure was invoked according to the second through $N^{th}$ procedure calls. The first procedure may be for configuring the second through $N^{th}$ wager gaming machines. If so, the first responsive message may indicate whether the second through $N^{th}$ wager gaming machines were configured according to the first procedure.

The method may also include these steps: forming second through $N^{th}$ messages according to the Gaming Standards Association's G2S Message Protocol, the second through $N^{th}$ messages comprising second through $N^{th}$ procedure calls for invoking second through $N^{th}$ procedures on second through $N^{th}$ wager gaming machines, each of the second through $N^{th}$ procedure calls located in the predetermined extension of the G2S Message Protocol; sending the second through $N^{th}$ messages to the second through $N^{th}$ wager gaming machines; and receiving second through $N^{th}$ responsive messages from the second through $N^{th}$ wager gaming machines. The second through $N^{th}$ responsive messages may indicate whether the second through $N^{th}$ procedures were invoked according to the second through $N^{th}$ procedure calls.

The method may also involve receiving a first indication to execute at least one wagering game on the first wager gaming machine according to predetermined instructions. The forming step may be responsive to the first indication.

The present invention provides other hardware (such as gaming machines, table games, kiosks, network devices and components of such devices) configured to perform the methods of the invention, as well as software to control devices to perform these methods.

These and other features of the present invention will be presented in more detail in the following detailed description of the invention and the associated figures.

EXAMPLES OF EMBODIMENTS

Figure 1:
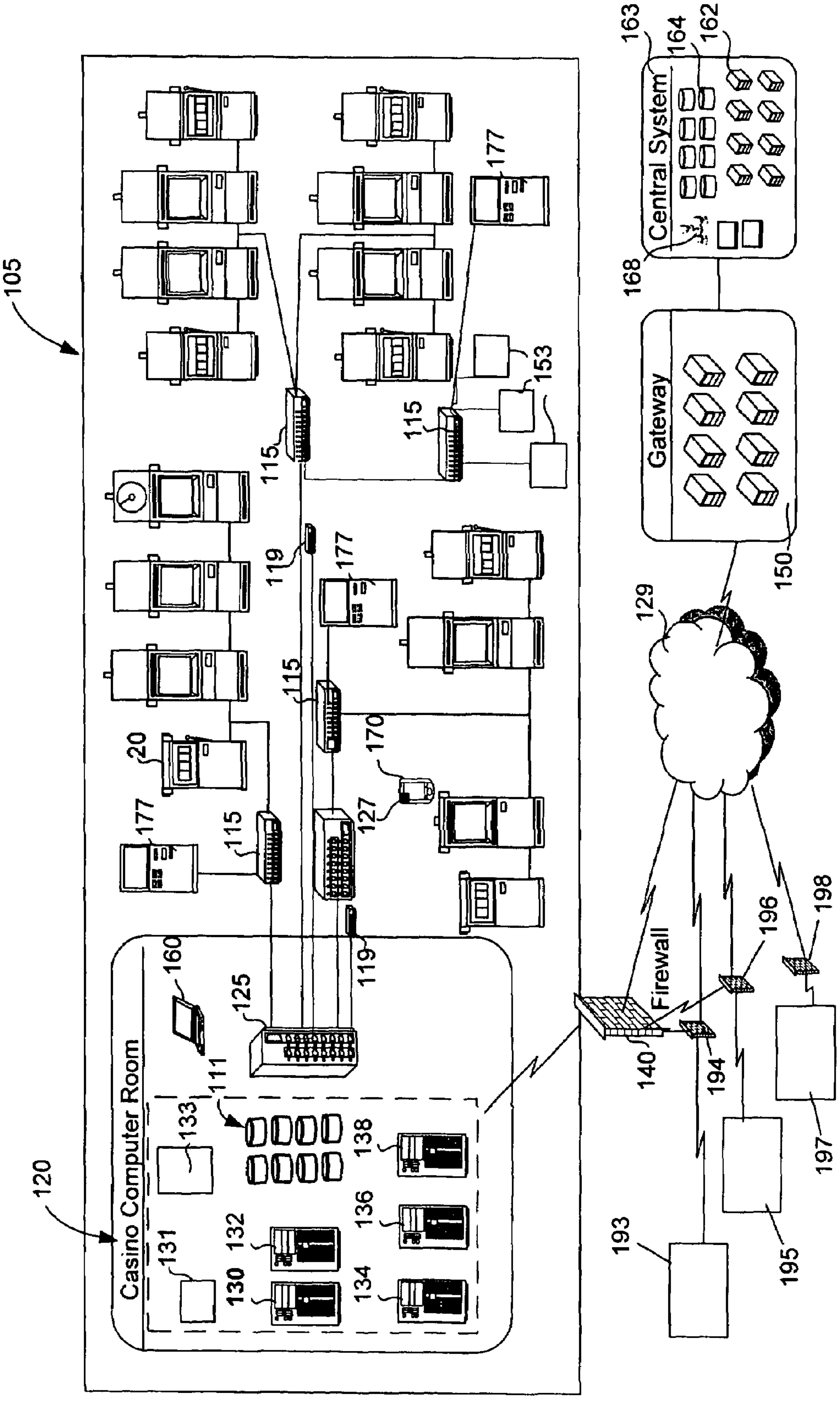
FIG. 1 illustrates one example of a network topology for implementing some aspects of the present invention.

Reference will now be made in detail to some specific examples of the invention, including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, some techniques of the present invention will be described in a particular context, e.g., that of gaming networks, including lottery networks, networks involving electronic gaming machines ("EGMs"), related devices and data, etc. Similarly, many example implementations of the invention may be described in the context of some type of gaming establishment, which may be a casino, a racetrack, a river boat, or another type of gaming establishment. (Such gaming establishments may be referred to herein as a "casino.") However, it should be understood that at least some aspects of the present invention pertain to other types of devices, networks, etc., particularly those involving secure data systems, sensitive and/or confidential data. For example, some aspects of the present invention apply to networks of automatic teller machines or similar devices in a banking network, financial networks and devices used therein (such as those used to trade securities), etc.

In the following description, numerous specific details are set forth in order to provide a thorough understanding of the present invention. Particular example embodiments of the present invention may be implemented without some or all of these specific details. In other instances, well-known process operations have not been described in detail in order not to obscure unnecessarily the present invention.

Various techniques and mechanisms of the present invention will sometimes be described in singular form for clarity. However, it should be noted that some embodiments include multiple iterations of a technique or multiple instantiations of a mechanism unless noted otherwise. For example, a logic system may use a logic device, such as a processor, a programmable logic device, etc., in a variety of contexts. However, it will be appreciated that a logic system can use multiple processors can while remaining within the scope of the present invention unless otherwise noted.

Similarly, the steps of the methods shown and described herein are not necessarily all performed (and in some implementations are not performed) in the order indicated. Moreover, some implementations of the methods discussed herein may include more or fewer steps than those shown or described.

Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Some examples of contexts for the invention will now be described with reference to the networks and devices depicted in FIGS. 1 and 2. Thereafter, various methods involving such devices and networks will be described with reference to the flow charts of FIG. 3 et seq.

Some gaming networks described herein allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines and other devices, such as kiosks, networked gaming tables, player stations, etc. Some such networks provide methods and devices for managing one or more networked gaming establishments. Such networks may sometimes be referred to herein as server-based gaming networks, sb™ networks, or the like.

Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES," in U.S. patent application Ser. No. 11/225,408 by Kinsley et al., entitled "METHODS AND DEVICES FOR AUTHENTICATION AND LICENSING IN A GAMING NETWORK" and filed Aug. 1, 2005, in U.S. patent application Ser. No. 11/078,966 by Nguyen et al., filed Mar. 10, 2005 and entitled "SECURED VIRTUAL NETWORK IN A GAMING ENVIRONMENT," and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes.

One example of a gaming network and related devices is depicted in FIG. 1. Those of skill in the art will realize that this architecture and the related functionality are merely examples and that the present invention encompasses many other such embodiments and methods. Moreover, some devices that are known in the art may be used in connection with the present invention, but have been left out of the drawings and discussion in order to focus on features more directly related to the invention.

Here, casino computer room 120 and networked devices of a gaming establishment 105 are illustrated. Gaming establishment 105 is configured for communication with central system 163 via gateway 150. Gaming establishments 193 and 195 are also configured for communication with central system 163.

In some implementations, gaming establishments may be configured for communication with one another. In this example, gaming establishments 193 and 195 are configured for communication with casino computer room 120. Such a configuration may allow devices and/or operators in casino 105 to communicate with and/or control devices in other casinos. In some such implementations, a server in computer room 120 may control devices in casino 105 and devices in other gaming establishments. Conversely, devices and/or operators in another gaming establishment may communicate with and/or control devices in casino 105. For example, a proxy server of casino 105, operating under the control of a central licensing manager of central system 163, may process licensing requests and control devices in casino 105 as well as gaming establishments 193 and 195.

Here, gaming establishment 197 is configured for communication with central system 163, but is not configured for communication with other gaming establishments. Some gaming establishments (not shown) may not be in communication with other gaming establishments or with a central system.

Gaming establishment 105 includes multiple gaming machines 20, each of which is part of a bank 110 of gaming machines 20. In this example, gaming establishment 105 also includes a bank of networked gaming tables 153. However, the present invention may be implemented in gaming establishments having any number of gaming machines, gaming tables, etc. It will be appreciated that many gaming establishments include hundreds or even thousands of gaming machines 20 and/or gaming tables 153, not all of which are necessarily included in a bank and some of which may not be connected to a network.

Some gaming networks provide features for gaming tables that are similar to those provided for gaming machines, including but not limited to bonusing, player loyalty/player tracking and the use of cashless instruments. Relevant material is provided in U.S. patent application Ser. No. 11/154,833, entitled "CASHLESS INSTRUMENT BASED TABLE GAME PROMOTIONAL SYSTEM AND METHODOLOGY" and filed on Jun. 15, 2005, U.S. Provisional Patent Application No. 60/858,046, entitled "AUTOMATED PLAYER DATA COLLECTION SYSTEM FOR TABLE GAME ENVIRONMENTS" and filed on Nov. 10, 2006, U.S. patent application Ser. No. 11/129,702, entitled "WIDE AREA TABLE GAMING MONITOR AND CONTROL SYSTEM" and filed on May 15, 2005, U.S. patent application Ser. No. 11/425,998 entitled "PROGRESSIVE TABLE GAME BONUSING SYSTEMS AND METHODS", filed Jun. 22, 2006 and U.S. patent application Ser. No. 11/225,299, entitled "UNIVERSAL CASINO BONUSING SYSTEMS AND METHODS" and filed on Sep. 12, 2005, all of which are incorporated herein by reference. Accordingly, software related to such features may be provided and/or controlled, and related data may be obtained and/or provided, according to the present invention.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 153 may be configured for communication with individual player terminals (not shown), which may be configured to accept bets, present an electronic representation of a dealer, indicate game outcomes, etc.

Some gaming networks include electronically configurable tables for playing table games. U.S. patent application Ser. No. 11/517,861, entitled "CASINO DISPLAY METHODS AND DEVICES" and filed on Sep. 7, 2006, describes some such tables and is hereby incorporated by reference. An operator may select a desired game, such as a poker game or a blackjack game, and the table will be automatically configured with geometrical patterns, text, etc., which are appropriate for the desired table game. The desired type of table game may be selected by a control on the table itself or according to instructions received from, e.g., a server or a casino manager via a network interface.

Gaming establishment 105 also includes networked kiosks 177. Depending on the implementation, kiosks 177 may be used for various purposes, including but not limited to cashing out, prize redemption, redeeming points from a player loyalty program, redeeming "cashless" indicia such as bonus tickets, smart cards, etc. In some implementations, kiosks 177 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present invention.

In this example, each bank 110 has a corresponding switch 115, which may be a conventional bank switch in some implementations. Each switch 115 is configured for communication with one or more devices in computer room 120 via main network device 125, which combines switching and routing functionality in this example. Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various aspects of the invention. IGT has also developed a gaming-industry-specific transport layer called CASH that rides on top of TCP/IP and offers additional functionality and security.

Here, gaming establishment 105 also includes an RFID network, implemented in part by RFID switches 119 and multiple RFID readers (not shown). An RFID network may be used, for example, to track objects (such as mobile gaming devices), patrons, etc., in the vicinity of gaming establishment 105. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, both of which are hereby incorporated by reference.

In this example, mobile device 170 includes RFID tag 127, which includes encoded identification information for mobile device 170. Accordingly, the location of mobile device 170 in gaming establishment 105 may be tracked via the RFID network. Other location-detection devices and systems, such as the global positioning system ("GPS"), may be used to monitor the location of devices in the vicinity of gaming establishment 105 or elsewhere.

Various alternative network topologies can be used to implement different aspects of the invention and/or to accommodate varying numbers of networked devices. For example, gaming establishments with large numbers of gaming machines 20 may require multiple instances of some network devices (e.g., of main network device 125, which combines switching and routing functionality in this example) and/or the inclusion of other network devices not shown in FIG. 1. Some implementations of the invention may include one or more middleware servers disposed between kiosks 177, RFID switches 119 and/or bank switches 115 and one or more devices in computer room 120 (e.g., a corresponding server). Such middleware servers can provide various useful functions, including but not limited to the filtering and/or aggregation of data received from switches, from individual gaming machines and from other devices. Some implementations of the invention include load-balancing methods and devices for managing network traffic.

Storage devices 111, sb™ server 130, License Manager 131, Arbiter 133, servers 132, 134, 136 and 138, host device (s) 160 and main network device 125 are disposed within computer room 120 of gaming establishment 105. In practice, more or fewer devices may be used. Depending on the implementation, some such devices may reside in gaming establishment 105 or elsewhere. Some of these servers may be configured to perform tasks relating to accounting, player loyalty, bonusing/progressives, configuration of gaming machines, etc. One or more such devices may b used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the invention provide one or more of these servers in the form of blade servers.

License manager 131 may also be implemented, at least in part, via one or more servers, storage devices, host devices, etc. Some exemplary operations of license manager 131 are described in detail in U.S. patent application Ser. No. 11/225,408 by Kinsley et al., entitled "METHODS AND DEVICES FOR AUTHENTICATION AND LICENSING IN A GAMING NETWORK" and filed Aug. 1, 2005 (the "License Manager Application"), which is hereby incorporated by reference.

However, in alternative implementations of the invention, license manager 131 operates, at least in part, under the control of a central licensing manager. Accordingly, licensing manager 131 may operate as a "licensing proxy," such as those described in U.S. patent application Ser. No. 11/725,853, entitled "Centralized Licensing Services" and filed on Mar. 19, 2007, which is hereby incorporated by reference for all purposes. One or more servers, storage devices, switches, routers, host devices and/or other devices, e.g., of casino computer room 120, may perform the functions of a licensing proxy and may collectively comprise license manager 131.

One or more devices in central system 163 may also be configured to perform tasks specific to the present invention. For example, one or more servers 162, storage devices 164 and/or host devices 168 of central system 163 may be configured to implement the functions described in detail below, particularly with reference to FIG. 3 et seq. These functions may include, but are not limited to, collecting data from devices (such as EGMs), configuring and/or controlling these devices according to remote procedure calls, authentication-related tasks, determining permission levels, encryption and/or decryption, etc.

Some preferred embodiments of sb™ server S30 and the other servers shown in FIG. 1 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the invention, many of these devices (including but not limited to License Manager 131, servers 132, 134, 136 and 138, and main network device 125) are mounted in a single rack with sb™ server 130. Accordingly, many or all such devices will sometimes be referenced in the aggregate as an "sb™ server." However, in alternative implementations, one or more of these devices is in communication with sb™ server 130 and/or other devices of the network but located elsewhere. For example, some of the devices could be mounted in separate racks within computer room 120 or located elsewhere on the network. Moreover, it can be advantageous to store large volumes of data elsewhere via a storage area network ("SAN").

Computer room 120 may include one or more operator consoles or other host devices that are configured for communication with other devices within and outside of computer room 120. Such host devices may be provided with software, hardware and/or firmware for implementing various aspects of the invention. However, such host devices need not be located within computer room 120. Wired host device 160 (which is a laptop computer in this example) and wireless device 170 (which is a PDA in this example) may be located elsewhere in gaming establishment 105 or at a remote location. Here, wireless device 170 is configured for network management tasks, but wireless devices 170 may also be configured as mobile gaming devices.

Some embodiments of the invention include devices for implementing access control, security and/or other functions relating to the communication between different devices on the network. In this example, arbiter 133 serves as an intermediary between different devices on the network. Arbiter 133 may be implemented, for example, via software that is running on a server or another networked device. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 2:
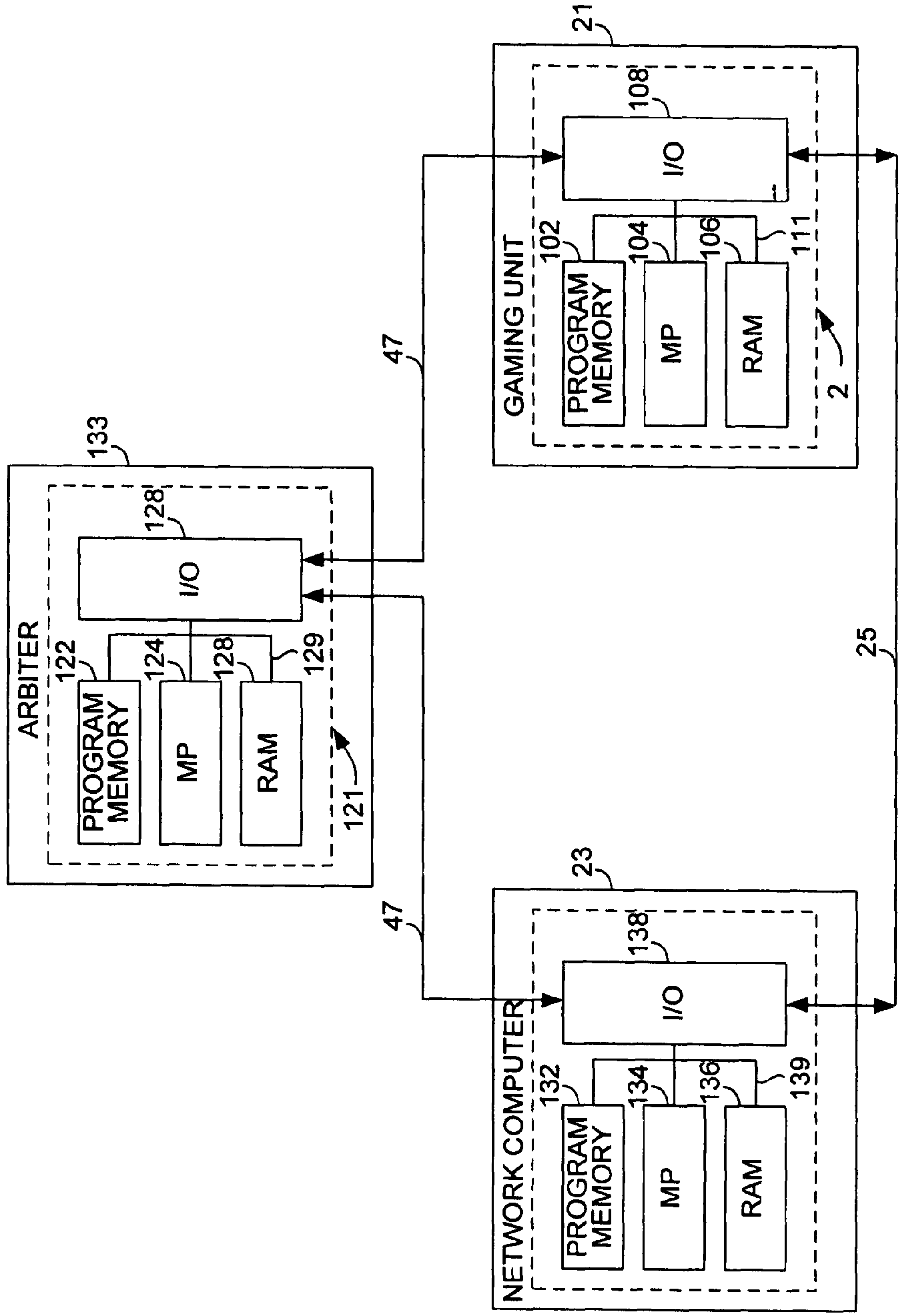
FIG. 2 is a block diagram that illustrates a simplified network topology that illustrates some implementations of an Arbiter.

FIG. 2 is a block diagram of a simplified communication topology between gaming unit 20, network computer 23 and Arbiter 133. Network computer 23 may be, for example, a server or other device within computer room 120 or elsewhere. Although only one gaming unit 20, one network computer 23 and one Arbiter 133 are shown in FIG. 2, it should be understood that the following examples may be applicable to different types of networked devices in addition to gaming unit 20 and network computer 23, and may include different numbers of network computers, gaming security arbiters and gaming units. For example, a single Arbiter 133 may be used for secure communications among a plurality of network computers 23 and tens, hundreds or thousands of gaming units 20. Likewise, multiple gaming security arbiters 46 may be utilized for improved performance and other scalability factors.

Referring to FIG. 2, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 4C as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 2 may each comprise multiple address/data buses, which may be of different types, and there may be an I/O circuit disposed between the address/data buses.

As shown in FIG. 2, the gaming unit 20 may be operatively coupled to the network computer 23 via the data link 25. The gaming unit 20 may also be operatively coupled to the Arbiter 133 via the data link 49, and the network computer 23 may likewise be operatively coupled to the Arbiter 133 via the data link 47. Communications between the gaming unit 20 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), download information (e.g., game and/or peripheral software, licensing information, etc.) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of devices in the gaming network, including but not limited to devices sending queries and/or remote procedure calls to gaming machines. The Arbiter 133 may receive a request for a communication session from a network device. For ease of explanation, the requesting network device may be referred to as the client, and the requested network device may be referred to as the host. The client may be any device on the network and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Preferably, the communication link(s) between casino 105 and central system 163 should have ample bandwidth and may, for example, comprise one or more T1 or T3 connections and/or satellite links having comparable bandwidth, etc. Network 129 is the Internet in this example. However, it will be understood by those of skill in the art that network 129 could include any one of various types of networks, such as the public switched telephone network ("PSTN"), a satellite network, a wireless network, a metro optical transport, etc. Accordingly, a variety of protocols may be used for communication on network 129, such as Internet Protocol ("IP"), Fibre Channel ("FC"), FC over IP ("FCIP"), Internet SCSI ("iSCSI," an IP-based standard for linking data storage devices over a network and transferring data by carrying SCSI commands over IP networks) or Dense Wavelength Division Multiplexing ("DWDM," an optical technology used to increase bandwidth over existing fiber optic backbones).

If a host device is located in a remote location, security methods and devices (such as firewalls, authentication and/or encryption) should be deployed in order to prevent the unauthorized access of the gaming network.

Similarly, any other connection between gaming network 105 and the outside world should only be made with trusted devices via a secure link, e.g., via a virtual private network ("VPN") tunnel. For example, the illustrated connection between sb™ server 130, gateway 150 and central system 163 (that may be used for communications involving peripheral device software downloads, etc.) is advantageously made via a VPN tunnel. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes. Additionally VPNs may be implemented using a variety of protocols, such as, for example, IP Security (IPSec) Protocol, Layer 2 Tunneling Protocol, Multiprotocol Label Switching (MPLS) Protocol, etc.

Details of these protocols, including RFC reports, may be obtained from the VPN Consortium, an industry trade group, VPNC, Santa Cruz, Calif.).

Alternatively, a permanent virtual circuit ("PVC") can be established to provide a dedicated and secure circuit link between two facilities, e.g., between casino and central system 163. A PVC is a virtual circuit established for repeated use between the same data terminals. A PVC could be provided, for example, via AT&T's Asynchronous Transfer Mode ("ATM") switching fabric. Some implementations provide a dedicated line from an endpoint (e.g., from casino 105) into the ATM backbone. Other implementations provide a connection over another network (e.g., the Internet) between an endpoint and the nearest device of the ATM backbone, e.g., to the nearest edge router. In some such implementations, the fixed-sized cells used in the ATM switching fabric may be encapsulated in variable sized packets (such as Internet Protocol or Ethernet packets) for transmission to and from the ATM backbone.

For security purposes, information transmitted to, on or from a gaming establishment may be encrypted. In one implementation, the information may be symmetrically encrypted using a symmetric encryption key, where the symmetric encryption key is asymmetrically encrypted using a private key. The public key may, for example, be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

Some network implementations may use Trusted Network Connect ("TNC"), which is an open architecture provided by the Trusted Network Connect Sub Group ("TNC-SG") of the Trusted Computing Group (TCG). TNC enables network operators to provide endpoint integrity at every network connection, thus enabling interoperability among multi-vendor network endpoints. Alternatively, or additionally, the Secure Internet File Transfer ("SIFT") may be employed. SIFT allows devices to send and receive data over the Internet in a secure (128-bit encryption) method of transport.

Providing secure connections between devices in a gaming network, such as the connections between the local devices of the gaming network 105 and central system 163, allows for the deployment of many advantageous features. For example, a customer (e.g., an employee of a gaming establishment) may be able to log onto an account of central system 163 to obtain the account information such as the customer's current and prior account status. Automatic updates of a customer's software may also be enabled. For example, central system 163 may notify one or more devices in gaming establishment 105 regarding new products and/or product updates. For example, central system 163 may notify server (or other device) in computer room 120 regarding new software, software updates, the status of current software licenses, etc. Alternatively, such updates could be automatically provided to a server in computer room 120 and downloaded to networked gaming machines.

After the local server receives this information, relevant products of interest may be identified (by the server, by another device or by a human being). If an update or a new software product is desired, it can be downloaded from the central system. Similarly, a customer may choose to renew a software license via a secure connection with central system 463, e.g., in response to a notification that the software license is required.

In addition, providing secure connections between different gaming establishments can enable alternative implementations of the invention. For example, a number of gaming establishments may be owned and/or controlled by the same entity. In such situations, having secure communications between gaming establishments makes it possible for a gaming entity to use one or more servers in a gaming establishment as an interface between central system 163 and gaming machines in multiple gaming establishments. For example, new or updated peripheral device software may be obtained by a server in one gaming establishment and distributed to gaming machines in that gaming establishment and/or other gaming establishments.

Figure 3A:
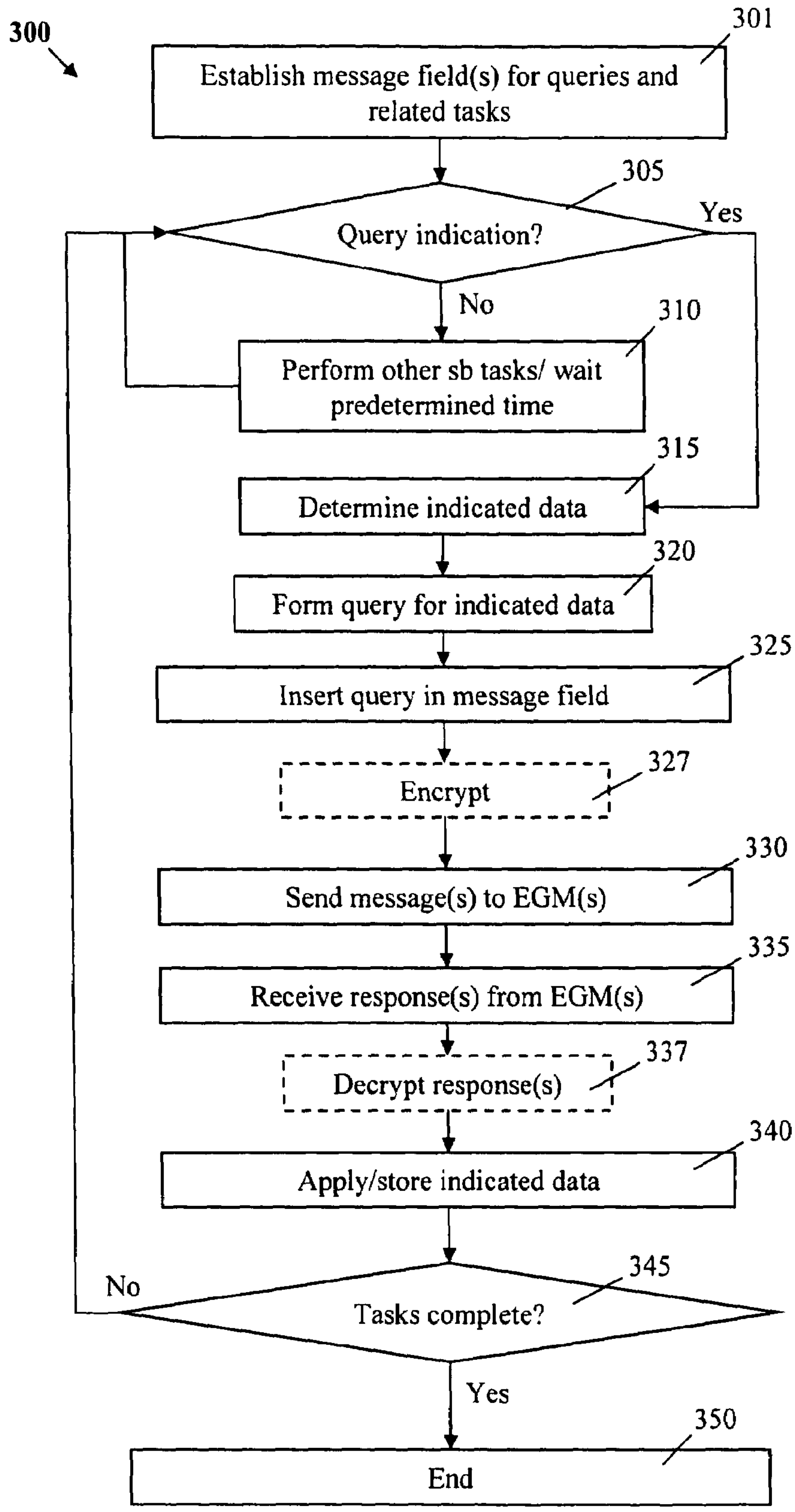
FIG. 3A is a flow chart that outlines some methods of the invention.

Method 300 of the invention will now be described with reference to the flow chart of FIG. 3A. The steps of method 300 may be performed, for example, by one or more host devices, servers, etc. of a gaming establishment. In some implementations, the same device(s) may provide such functionality for multiple gaming establishments. In this example, the steps of method 300 are performed, at least in part, by a server of casino computer room 120. (See FIG. 1.) Here, the device performing these steps is also configured to perform other functions. However, in other implementations, the device may be dedicated to database queries and/or responses.

In step 301, one or more predetermined portions of a packet, frame or other message unit are established for query strings. The query strings may be formed according to any convenient query language, such as Structured Query Language ("SQL") or the like. Similarly, the message may be in any format that is appropriate for the type of communication involved. Some preferred implementations in the gaming context use the Gaming Standards Association's G2S Message Protocol. Other such implementations may use Super-SASg, Best of Breed ("BOB") or some other protocol, which may be in the public domain or may be proprietary.

Regardless of the particular type of query language or communication protocol used, a predetermined location is preferably established for query strings in step 301. For example, in implementations using the G2S Message Protocol, an entity (e.g., a company such as IGT) may reserve a predetermined extension of a G2S packet for a particular purpose. This location is called a "message field" in FIG. 3A, but may be referred to as a location, an extension, a field, etc., herein. Fields, or portions of fields, may be established for related tasks, e.g., for tasks relating to access control/permissions, to authentication (e.g., for responses to authentication challenges), or the like.

Figure 3B:
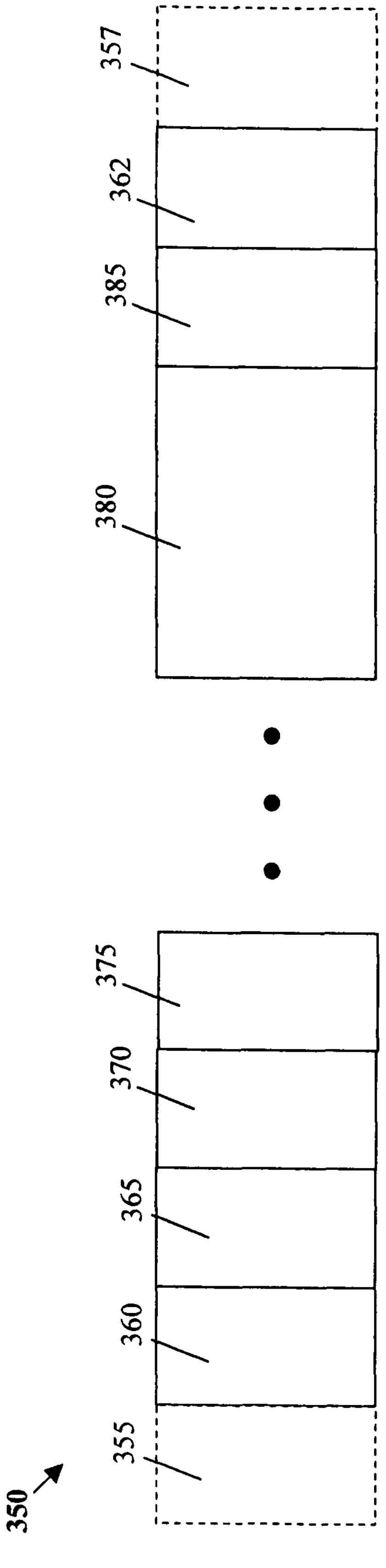
FIG. 3B is a block diagram that indicates a simplified version of a packet that may be used to implement some methods of the invention.

One simple example will now be described with reference to FIG. 3B. Packet 350 is a generic type of communication packet that is used to illustrate how some of the general features of the invention may be implemented. Although the terms "packet" and "frame" may be used in somewhat different ways by those of skill in the art, the terms will be used interchangeably herein to indicate a message unit of some type. Only a few fields of packet 350 are indicated. It will be appreciated by those of skill in the art that packets generally include more or fewer fields than those shown in FIG. 3B. The size of the fields shown in FIG. 3B does not necessarily bear any relationship to the size of fields used for implementing the invention; moreover, some such fields may have a variable length.

Encapsulation fields 355 and 357 are indicated in dashed lines to indicate that, in some implementations, packet 350 may have previously been encapsulated for transmission according to another protocol, then decapsulated. For example, packet 350 may have been sent over an external network, received by a device in a gaming network and then decapsulated prior to being received by an EGM.

SOF field 360 and EOF 362 are ordered sets of symbols used to delimit the boundaries of packet 350. In some implementations, SOF field 360 and/or EOF 362 may also include information regarding the class of the frame, whether the frame is the start or the end of a sequence (a group of frames), whether the frame is normal or abnormal, etc.

Packet 350 also includes destination ID field 365 and source ID field 370. Destination ID field 365 and/or source ID field 370 may include subfields for, e.g., organization ID and device ID. In some implementations of the invention, a permission level for a query may depend, at least in part, on a source device, a sender's ID and/or an organization ID. In some such implementations, there may be different permission levels for different categories of machines and/or users. For example, there may be different permission levels for a gaming establishment operator, for a regulator, for a manufacturer and for another gaming machine. There may be read and/or write authorization levels corresponding to each of the permission levels.

In this example, field 375 indicates that a query string, a remote procedure call, etc., is included in packet 350. Field 375 may also indicate whether packet 350 includes data responsive to such instructions. For example, field 375 may indicate that the packet includes data responsive to a query request or data indicating whether a procedure was successfully invoked by a remote procedure call. Here, field 375 is a short field in which bits are set (or not) to indicate whether the packet will include such instructions and/or data. In this example, if a receiving EGM (or other device) receives a packet having a particular bit in field 375 set, the device will be configured (e.g., by software or firmware) to look in a predetermined field for a query string, a remote procedure call or other instructions and/or data. In other implementations, SOF field 360 may indicate some or all of the information which, in this example, is included in field 375.

Moreover, in alternative implantations, field 375 may include more information than the field 375 of the current example: field 375 may also indicate the protocol, language, format, etc., of the instructions used for the query string, remote procedure call, etc. In some such implementations, field 375 may also indicate another field that will include the instructions. Alternatively, field 375 itself may include the instructions.

However, in this example, the instructions themselves are included in field 380. Here, the instructions comprise an SQL query string. Accordingly, the query string may indicate both the type(s) of data requested and the format for the requested data. In this example, the requested data will be returned in field 380 of a responsive message.

Field 385 is a checksum field or the like. For example, field 385 may comprise a CRC field.

Returning now to FIG. 3A, the description of method 300 will now resume. In step 305, it is determined whether there is an indication to query one or more devices. The indication may, for example, be received by (or generated by) a device of casino computer room 120, such as a server, a host device, etc. For example, some kinds of information may be gathered at predetermined time intervals. Therefore, the indication may be related to a passage of a predetermined amount of time. Alternatively, the indication may comprise (or be responsive to) a person's request, e.g., a casino operator's request. The indication may comprise a request for information from another device, such as an accounting server, a game theme server, a peripheral device code server, a bonusing server, an Advantage™ server, etc.

If there is no present indication to form a query, the device may continue to perform other operations, e.g., operations related to the functions of an sb system. (Step 310.) If no indication to form a query is received the device may wait a predetermined period of time, e.g., a time until a query is scheduled to be made.

However, if it is determined in step 305 that there is an indication that a query should be made, the type of data requested is determined (step 315) and a corresponding query is formed. (Step 320.) The query may, for example, reference fields in a database that are named according to a known convention. In step 325, the query is put into the predetermined message field, as established in step 301. In some implementations, part or all of the message will be encrypted. (Step 327.) One or more messages are then transmitted to other devices, which are EGMs in this example. (Step 330.)

Some examples of processes that take place on the receiving device's (or devices') side will be described in detail below. As noted there, not all requests for data will be accepted and therefore not all of the messages sent in step 330 will result in responsive messages containing the requested data. For example, a requester may not respond satisfactorily to an authentication challenge, may not have a sufficiently high permission level for the type of information sought by the query, etc.

However, in this example, at least one response is received that includes the requested data. (Step 335.) The response will be decrypted, if necessary. (Step 337.) The data may then be used and/or stored, as indicated. (Step 340.)

In step 345, it may be determined whether the device has completed, at least temporarily, the tasks in its queue. If so, the process ends. (Step 350.) If not, the device may continue performing other tasks until a query indication is received.

Figure 4:
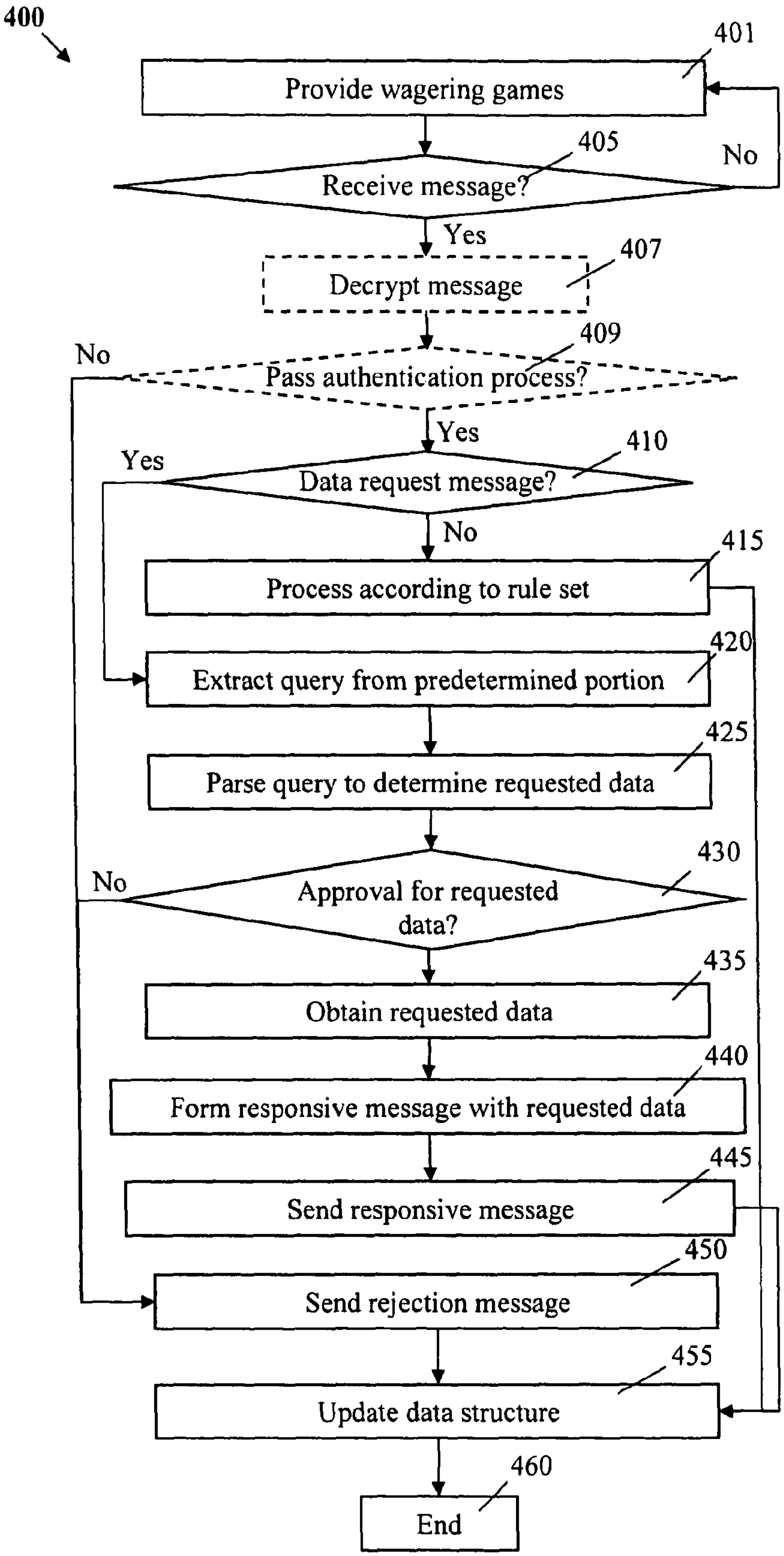
FIG. 4 is a flow chart that outlines other methods of the invention.

FIG. 4 is a flow chart that outlines one example of a process that may be performed by a device that receives a query message such as that described above. In this example, the receiving device is an EGM. Accordingly, the EGM provides wagering games (step 401) and updates one or more internal data structures accordingly.

In step 405, a logic system of the EGM determines whether a message has been received. If so, the logic system decrypts the message, if necessary (step 407). According to some implementations, the EGM may present an authentication challenge or the like. (Step 409.) If the requesting device or person provides a satisfactory response, the EGM then determines whether the message is a data request/query message. (Step 410.) For example, the EGM may determine whether a predetermined bit has been set, parse data in a "message type" field, etc. In some implementations, an authentication challenge may be presented after determining whether the message includes a request to read or write data, a remote procedure call, or the like, instead of before step 410.

Preferably, the EGM is configured such that it can continue to provide wagering games while processing query messages. For example, the EGM may be configured to allocate at least a minimum portion of its resources (including memory, logic system usage, etc.) to providing wagering games, even while processing query messages.

If the message is not a data request message, it will be processed according to an applicable rule set. (Step 415.) For example, if the message includes a remote procedure call, it may be processed as described below with reference to FIG. 6. In some implementations, a message may indicate more than one type of response. For example some messages may include both a query and a remote procedure call, a remote procedure call may involve a database query, etc.

If the message contains a query, the query will be extracted from a predetermined part of the message in this example. (Step 420.) The query will then be parsed to determine the requested data (step 425). The data may comprise, for example, game usage data, wagering data, device configuration data, peripheral device data, etc. Such data may be collectively referred to herein as "wager gaming data" or the like.

In this example, it will then be determined whether the requested data should be provided. (Step 430.) This determination may be made, at least in part, by reference to the ID of the source device. In some implementations, the determination will be made by comparing a permission level of the source device, an associated person, etc., with a category of the requested data. For example, wagering data may be assigned a higher level of confidentiality than peripheral type data. The latter could, for example, be made available to a manufacturer whereas the former might not be. If the data request is not in accordance with a permission level, the requested data will not be provided. In some implementations, the determination will be made by the EGM. However, the determination may also be made, at least in part, according to input from another trusted device, e.g., an authentication server, an Arbiter or the like.

If it is determined in step 430 that the requested data should not be provided, a rejection message is sent to the requesting device. (Step 450.) A notification may be sent to another device, such as a device of a security system, an error notification system, etc.

However, if it is determined in step 430 that the requested data should be provided, the requested data are obtained. (Step 435.) For example, step 435 may involve obtaining data from fields indicated in the query. Alternatively, or additionally, step 435 may involve some form of database searching, such as key word searching, Boolean searching, etc. Such searches may be advantageous, for example, if different EGMs have different database structures, different naming conventions, etc.

The responsive data will be formed into a responsive message and may be encrypted. (Step 440.) The data are preferably inserted into a predetermined field of the responsive message, which may or may not be the same field within which the query was included in the message received by the EGM. Preferably, the query indicates a format for the requested data and the data are provided in the requested format. The responsive message is sent to the requesting device and/or to one or more other indicated devices. (Step 445.) Whether or not the responsive message includes the requested data, the event is preferably logged: at least a local data structure is preferably updated. (Step 455.)

Figure 5:
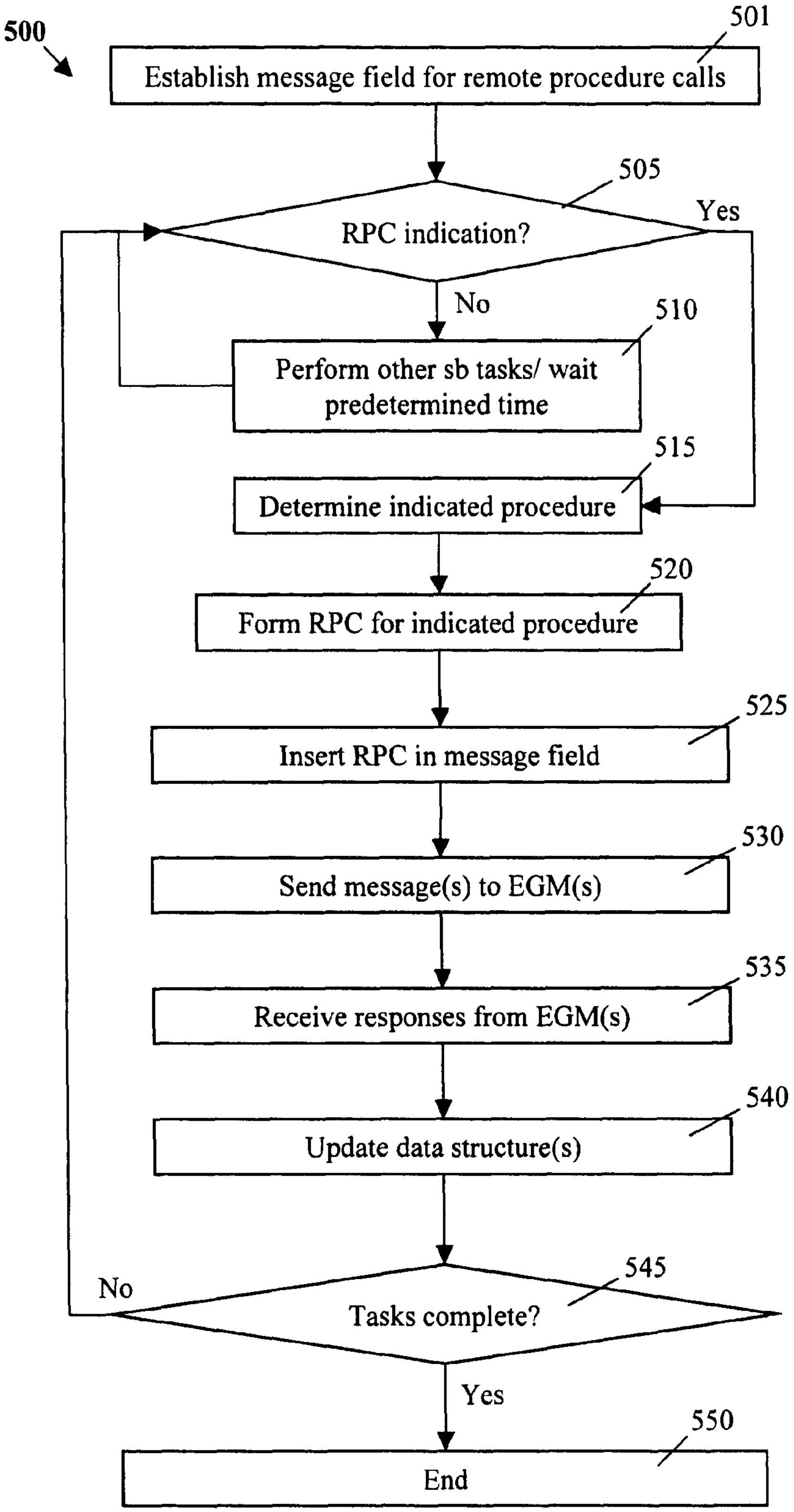
FIG. 5 is a flow chart that outlines alternative methods of the invention.

FIG. 5 outlines one method 500 of including remote procedure calls in communications with EGMs or other devices. As before, the steps of method 500 may be performed, at least in part, by a device in (or a device in communication with) a casino's computer center. In step 501, a message field is established for including one or more remote procedure calls. The predetermined field may or may not be the same field used for queries. For example, a different field of a packet may indicate whether the same predetermined field contains a query or a remote procedure call. However, in this example, the predetermined field is a different field from that used for queries.

In step 505, it is determined whether there is an indication to make a remote procedure call. For example, it may be determined whether an EGM (or other device) should be configured to present another game theme, should receive other software (e.g., peripheral device software), or should be reconfigured in some other fashion. Such a determination may be made, for example, with regard to tasks performed in connection with an sb™ system, as described elsewhere herein.

If no indication is received, the device may wait a predetermined time, perform other tasks, etc., as appropriate for its configuration. (Step 510.) However, when a remote procedure call indication is received, the procedure is determined (step 515) and a corresponding remote procedure call is formed. (Step 520.) For example, step 515 and/or 520 may be performed with reference to one or more data structures containing sb-related tasks and corresponding procedure calls. The corresponding remote procedure call is inserted in the predetermined message field (step 525) and the message is sent to one or more EGMs. (Step 530.) The message may be encrypted.

In step 535, a response is received from the EGM(s) indicating whether or not the indicated procedure was invoked and successfully performed. The response may be decrypted, if necessary. The response is preferably logged. (Step 540.) As with query messages, in some implementations, the receiving device will make a determination as to whether or not to allow the procedure to be called, e.g., according to a permission level of the requesting device and a category of the procedure.

In step 545, it is determined whether there are additional tasks to be performed. If the responsive message indicates that the procedure was not invoked and/or was not successfully performed, the sending device will preferably respond according to a predetermined rule set. For example, the sending device may try again, may send a query for diagnostic data, may send a message to an operator, etc. If there are no additional tasks to be performed, the process may end (at least temporarily). (Step 550.)

Figure 6:
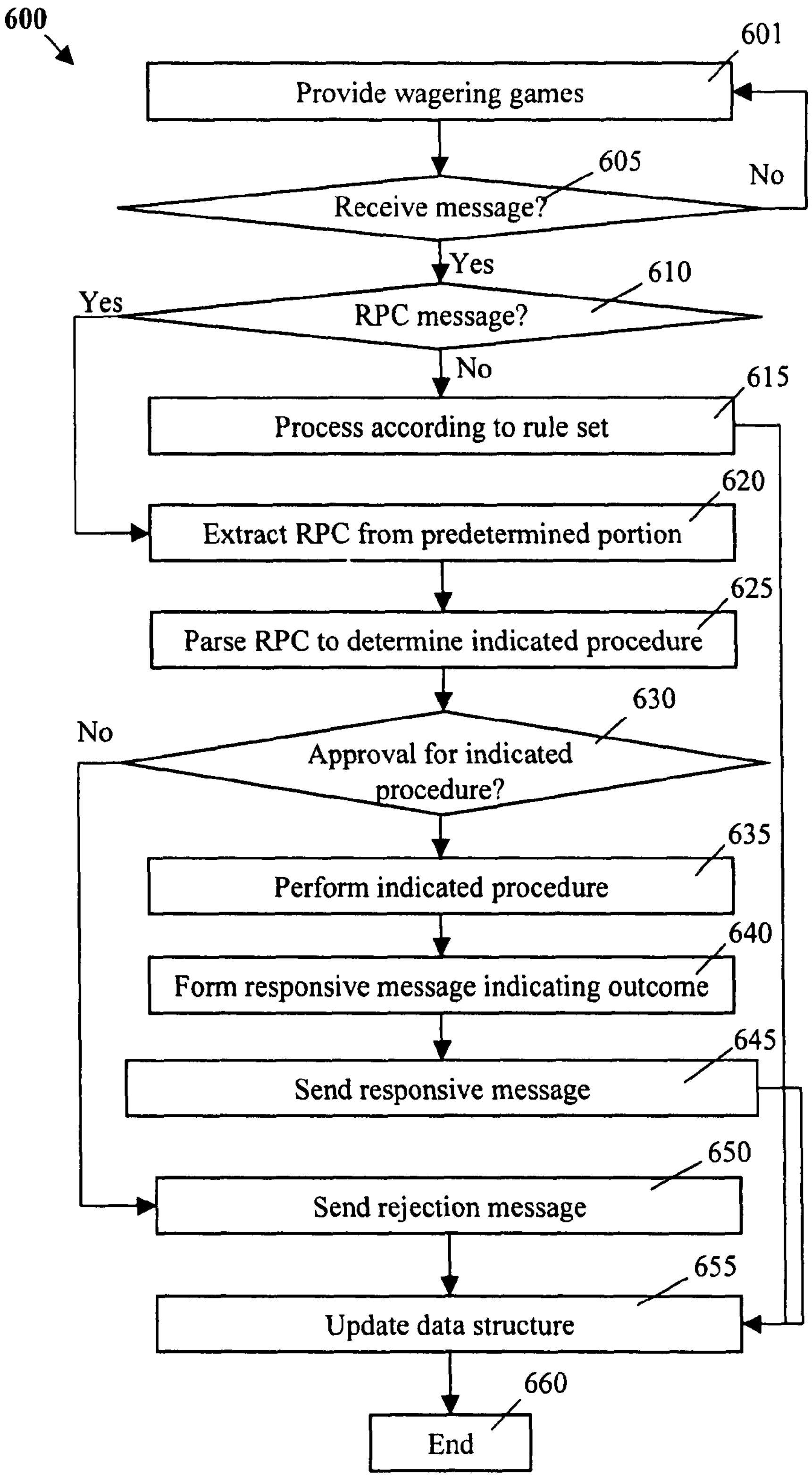
FIG. 6 is a flow chart that outlines another method of the invention.

FIG. 6 outlines steps of method 600, which may be performed by an EGM that receives messages of the kind indicated with reference to FIG. 5. In step 601, the EGM provides wagering games and updates one or more internal data structures accordingly.

In step 605, a logic system of the EGM determines whether a message has been received. If so, the message will be decrypted, if necessary. The logic system determines whether the message includes a remote procedure call. (Step 610.) For example, the EGM may determine whether a predetermined bit has been set, interpret data in a "message type" field, etc. Either before or after the determination of step 610, the EGM may perform an authentication challenge or the like and may determine whether the response is satisfactory.

An EGM may or may not be configured to continue to provide wagering games while processing messages that include remote procedure calls. Some remote procedure calls (e.g., the changing of a current game theme presentation) may require the EGM to temporarily stop providing wagering games. However, the EGM may be configured to allocate at least a minimum portion of its resources (including memory, logic system usage, etc.) to providing wagering games, even while processing some types of remote procedure calls.

If the message is not a remote procedure call message, it will be processed according to an applicable rule set. (Step 615.) For example, if the message includes a query, it may be processed as described above. As noted elsewhere, a message may indicate more than one type of response.

If the message contains a remote procedure call, the procedure call will be extracted from a predetermined part of the message in this example. (Step 620.) The query will then be parsed to determine the indicated procedure (step 625). Preferably, it will then be determined whether the indicated procedure should be performed. (Step 630.) This determination may be made, at least in part, according to permission levels. For example, the determination may be made by reference to a permission level assigned to the ID of the source device and to a corresponding list of approved (or forbidden) procedures for that permission level. In some implementations, the determination will be made by the EGM. However, the determination may also be made, at least in part, according to input from another trusted device, e.g. an authentication server, a licensing server or the like. For example, a licensing server may determine whether an existing license has been obtained for installing an indicated type of software.

If it is determined in step 630 that the requested procedure should not be performed, a rejection message is sent to the requesting device. (Step 650.) A notification may be sent to another device, such as a device of a security system, an error notification system, etc. However, if it is determined in step 630 that the requested procedure should be performed, it is performed. (Step 635.)

A responsive message is preferably formed (step 640) and sent (step 645), indicating whether the requested procedure was performed. For example, if the remote procedure call was for the purpose of configuring a device in an indicated fashion, the response may indicate whether the device was configured as indicated. If the remote procedure call was for the purpose of executing one or more wagering games in a predetermined fashion, the response may indicate not only whether the wagering games were executed, but also the game outcomes and related win/loss data.

The responsive data are preferably inserted into a predetermined field of the responsive message, which may or may not be the same field within which the remote procedure call was included in the message received by the EGM. Preferably, the remote procedure call indicates a format for the responsive data and the data are provided in the indicated format. The responsive message may be encrypted. The responsive message may be sent to the requesting device and/or to one or more other indicated devices. Whether or not the responsive message indicates that the procedure was called, the event is preferably logged. (Step 655.)

Gaming Machine

Figure 7:
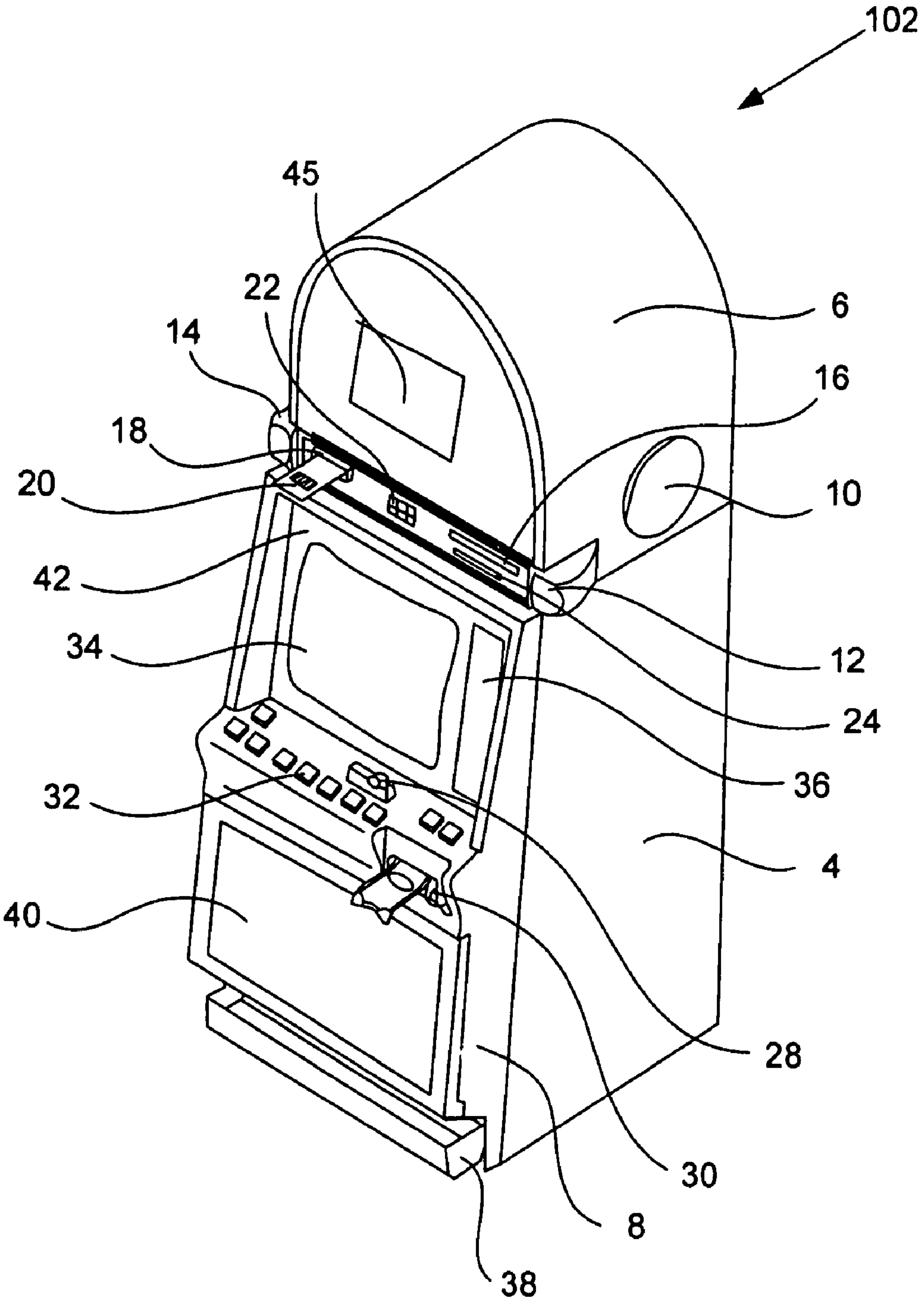
FIG. 7 illustrates a gaming machine that may be configured according to some aspects of the invention.

Turning next to FIG. 7, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

One might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 7, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 8:
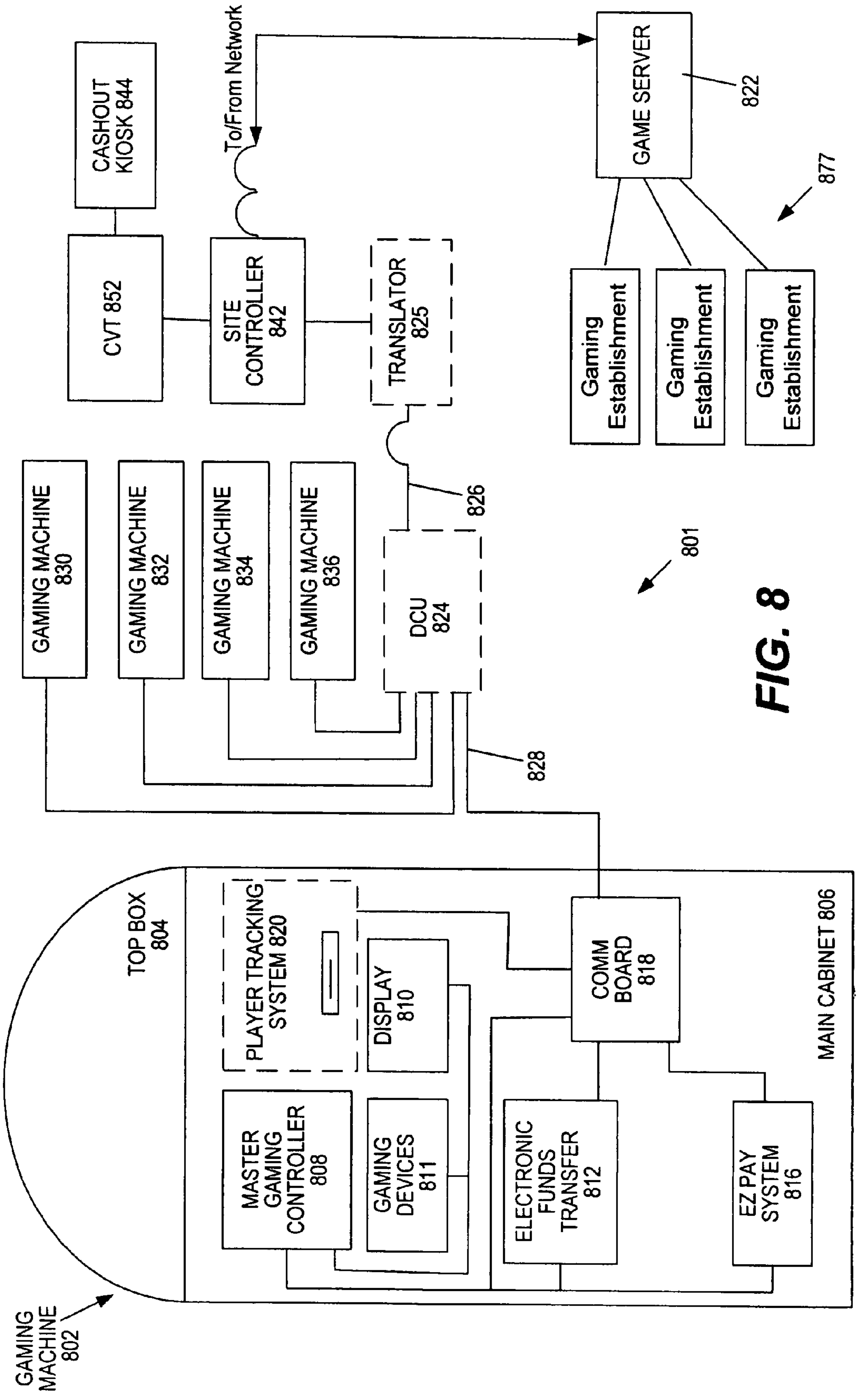
FIG. 8 illustrates a gaming machine and network that may be configured according to some aspects of the invention.

A gaming network that may be used to implement additional methods performed in accordance with embodiments of the invention is depicted in FIG. 8. Gaming establishment 801 could be any sort of gaming establishment, such as a casino, a card room, an airport, a store, etc. In this example, gaming network 877 includes more than one gaming establishment, all of which are networked to game server 822.

Here, gaming machine 802, and the other gaming machines 830, 832, 834, and 836, include a main cabinet 806 and a top box 804. The main cabinet 806 houses the main gaming elements and can also house peripheral systems, such as those that utilize dedicated gaming networks. The top box 804 may also be used to house these peripheral systems.

The master gaming controller 808 controls the game play on the gaming machine 802 according to instructions and/or game data from game server 822 or stored within gaming machine 802 and receives or sends data to various input/output devices 811 on the gaming machine 802. In one embodiment, master gaming controller 808 includes processor(s) and other apparatus of the gaming machines described above in FIGS. 6 and 7. The master gaming controller 808 may also communicate with a display 810.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 808 may also communicate with EFT system 812, EZPay™ system 816 (a proprietary cashless ticketing system of the present assignee), and player tracking system 820. The systems of the gaming machine 802 communicate the data onto the network 822 via a communication board 818.

It will be appreciated by those of skill in the art that embodiments of the present invention could be implemented on a network with more or fewer elements than are depicted in FIG. 8. For example, player tracking system 820 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 824 and translator 825 are not required for all gaming establishments 801. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machine are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 842 provides this function for gaming establishment 801. Site controller 842 is connected to a central system and/or other gaming establishments via one or more networks, which may be public or private networks. Among other things, site controller 842 communicates with game server 822 to obtain game data, such as ball drop data, bingo card data, etc.

In the present illustration, gaming machines 802, 830, 832, 834 and 836 are connected to a dedicated gaming network 822. In general, the DCU 824 functions as an intermediary between the different gaming machines on the network 822 and the site controller 842. In general, the DCU 824 receives data transmitted from the gaming machines and sends the data to the site controller 842 over a transmission path 826. In some instances, when the hardware interface used by the gaming machine is not compatible with site controller 842, a translator 825 may be used to convert serial data from the DCU 824 to a format accepted by site controller 842. The translator may provide this conversion service to a plurality of DCUs.

Further, in some dedicated gaming networks, the DCU 824 can receive data transmitted from site controller 842 for communication to the gaming machines on the gaming network. The received data may be, for example, communicated synchronously to the gaming machines on the gaming network.

Here, CVT 852 provides cashless and cashout gaming services to the gaming machines in gaming establishment 801. Broadly speaking, CVT 852 authorizes and validates cashless gaming machine instruments (also referred to herein as "tickets" or "vouchers"), including but not limited to tickets for causing a gaming machine to display a game result and cash-out tickets. Moreover, CVT 852 authorizes the exchange of a cashout ticket for cash. These processes will be described in detail below. In one example, when a player attempts to redeem a cash-out ticket for cash at cashout kiosk 844, cash out kiosk 844 reads validation data from the cashout ticket and transmits the validation data to CVT 852 for validation. The tickets may be printed by gaming machines, by cashout kiosk 844, by a stand-alone printer, by CVT 852, etc. Some gaming establishments will not have a cashout kiosk 844. Instead, a cashout ticket could be redeemed for cash by a cashier (e.g. of a convenience store), by a gaming machine or by a specially configured CVT.

Some methods of the invention combine information that can be obtained from game network accounting systems with features described above. By combining, for example, information regarding scheduled gaming machine configurations and information regarding the amount of money that a gaming machine brings in while a gaming machine has a particular configuration, gaming machine configurations may be optimized to maximize revenue. Some such methods involve determining a first rate of revenue obtained by a gaming machine in the gaming network during a first time when the gaming machine has a first configuration. The gaming machine is later automatically configured according to second configuration information supplied by the SBG server, e.g., as scheduled by the Scheduler. A second rate of revenue, obtained by the gaming machine during a second time when the gaming machine has the second configuration, is determined, and so on.

After scheduling various configurations at various times, optimum configurations for the gaming machine may be determined for various times of day. The SBG system can them provide scheduled optimal configurations for the gaming machine at the corresponding times of day. Some implementations provide for groups (e.g., banks) of gaming machines to be automatically configured according to a predetermined schedule of optimal configurations for various times of day, days of the week, times of the year, etc.

In some such implementations, an average revenue may be computed, based on revenue from many gaming machines having the same configuration at the same time of day. These average revenues could be used to determine an overall optimal value for relevant time periods.

Figure 9:
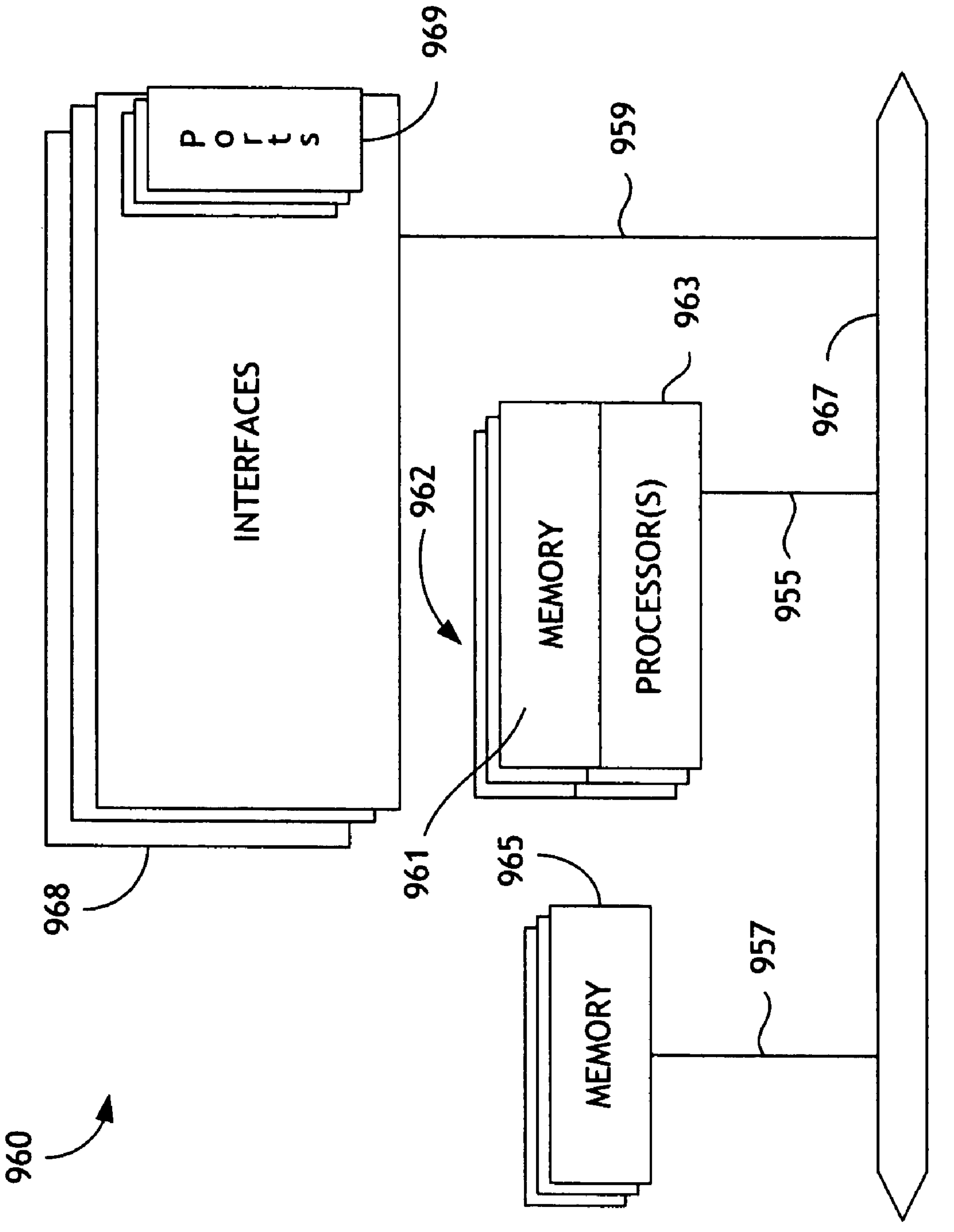
FIG. 9 illustrates a network device that may be configured according to some aspects of the invention.

FIG. 9 illustrates an example of a network device that may be configured for implementing some methods of the present invention. Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 968 control such communications-intensive tasks as encryption, decryption, compression, decompression, packetization, media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "linecards"). Generally, interfaces 968 control the sending and receiving of data packets over the network and sometimes support other peripherals used with the network device 960. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 962 may be responsible for implementing specific functions associated with the functions of a desired network device. According to some embodiments, CPU 962 accomplishes all these functions under the control of software including an operating system and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 9) or switch fabric based (such as a cross-bar).

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

We claim:

1. A wager gaming machine, comprising:

means for providing wagering games;

a network interface;

a memory having a database stored therein, the database comprising wager gaming data and having fields organized according to a predetermined format; and a logic system configured to do the following:

determine whether a first message has been received from a device via the network interface;

decrypt the first message, if necessary;

subject the first message to an authentication challenge;

if the first message passes the authentication challenge, determine whether the first message includes a data request message;

if the first message includes a data request message, extract a query string from a predetermined portion of the first message, wherein the predetermined portion comprises a predetermined extension to the Gaming Standards Association's G2S Message Protocol, wherein the query string is formed according to a query language and comprises an indicated format for indicated wager gaming data;

parse the query string to determine the indicated format for indicated wager gaming data;

select one of game usage data, wagering data, configuration data, or peripheral device data from the database based upon the indicated format to form the indicated wager gaming data;

form a second message comprising the indicated wager gaming data such that the indicated wager gaming data are provided in the indicated format; and send the second message to the device via the network interface.

2. The wager gaming machine of claim 1, wherein the first and second messages are formatted according to the Gaming Standards Association's G2S Message Protocol.

3. The wager gaming machine of claim 1, wherein the query language comprises Structured Query Language ("SQL"), and the query string comprises a Structured Query Language query string.

4. The wager gaming machine of claim 1, wherein the predetermined portion comprises a predetermined field.

5. The wager gaming machine of claim 1, wherein the logic system is further configured to determine a permission level of the first message and to obtain indicated wager gaming data according to the permission level.

6. The wager gaming machine of claim 1, wherein the logic system is further configured to determine new wager gaming data and update the database in the predetermined format according to the new wager gaming data.

7. The wager gaming machine of claim 1, wherein the logic system comprises at least one of a processor and a programmable logic device.

8. The wager gaming machine of claim 1, wherein the logic system is further configured to encrypt at least a portion of the second message.

9. A method, comprising:

receiving, via a network interface of a wager gaming machine, a first message from a device;

decrypting at least a portion of the first message, if necessary;

sending an authentication challenge to the device, receiving a response to the authentication challenge and determining whether the response to the authentication challenge is adequate;

if the response to the authentication challenge is adequate, determining whether the first message includes a data request message;

if the first message includes a data request message, extracting a query string from a predetermined portion of the first message, wherein the query string specifies at least one indicated field of a database, and the predetermined portion comprises a predetermined extension to the Gaming Standards Association's G2S Message Protocol, wherein the query string is formed according to a query language and comprises an indicated format for indicated wager gaming data;

parsing the query string to determine the indicated format for indicated wager gaming data;

select one of game usage data, wagering data, configuration data, or peripheral device data from the database based upon the indicated format to form the indicated wager gaming data;

obtaining requested wager gaming data from the at least one indicated field of the database;

forming a second message comprising the requested wager gaming data; and sending the second message to the device via the network interface.

10. The method of claim 9, wherein the first and second messages are formatted according to the Gaming Standards Association's G2S Message Protocol.

11. The method of claim 9, wherein the query language comprises Structured Query Language ("SQL"), and the query string comprises a Structured Query Language query string.

12. The method of claim 9, wherein the predetermined portion comprises a predetermined field.

13. The method of claim 9, wherein the parsing step comprises parsing the query string to determine an indicated format for the indicated wager gaming data, the indicated wager gaming data comprise at least one of the game usage data, wagering data, configuration data and peripheral device data selected from the database based upon the indicated format, and wherein the forming step comprises providing the indicated wager gaming data in the indicated format.

14. The method of claim 9, further comprising:
determining a permission level of the first message; and
obtaining indicated wager gaming data according to the permission level.

15. The method of claim 9, further comprising encrypting at least a portion of the second message.

16. A wager gaming machine, comprising:
means for providing wagering games;
a network interface;
a memory having a database stored therein, the database comprising wager gaming data and having fields organized according to a predetermined format; and
a logic system configured to do the following:
determine whether a first message from a device has been received via the network interface;
decrypt the first message, if necessary;
subject the first message to an authentication challenge,
if the first message passes the authentication challenge, determine whether the first message includes a procedure call or a data request message;
if the first message includes a procedure call, extract a representation of the procedure call from a predetermined portion of the first message, wherein the representation of the procedure call specifies a computer-executable procedure to be executed when the message is received and the predetermined portion comprises a predetermined extension of the G2S Message Protocol;
determine whether to perform the computer-executable procedure,
wherein the determination is made with reference to a permission level assigned to the device and to a corresponding list of approved or forbidden procedures associated with the permission level;
execute the computer-executable procedure according to the representation of the procedure call in response to determining that the procedure is to be performed; and
if the first message includes a data request message, extract a query string from the predetermined portion of the first message, wherein the query string is formed according to a query language and comprises an indicated format for indicated wager gaming data, parse the query string to determine the indicated format for indicated wager gaming data, and select one of game usage data, wagering data, configuration data, or peripheral device data from the database based upon the indicated format to form the indicated wager gaming data.

17. The wager gaming machine of claim 16, wherein the first message is formatted according to the Gaming Standards Association's G2S Message Protocol.

18. The wager gaming machine of claim 16, wherein the logic system is further configured to do the following:
form a second message indicating that the procedure was executed; and
send the second message to the device via the network interface.

19. The wager gaming machine of claim 16, wherein the procedure comprises changing a configuration of the means for providing wagering games.

20. The wager gaming machine of claim 16, wherein the logic system comprises at least one of a processor and a programmable logic device.

* * * * *